United States Patent [19]

Briggs, Jr. et al.

[11] Patent Number: 4,496,677
[45] Date of Patent: Jan. 29, 1985

[54] STABILIZED FLUOROPOLYMER COMPOSITION

[75] Inventors: James E. Briggs, Jr., Hackettstown; Kwang-Ho Chu, Flemington; Daniel C. Chung, Bridgewater, all of N.J.

[73] Assignee: Allied Corporation, Morris Township, Morris County, N.J.

[21] Appl. No.: 580,964

[22] Filed: Feb. 16, 1984

[51] Int. Cl.³ ............................................. C08L 27/12
[52] U.S. Cl. ................................................... 524/108
[58] Field of Search ......................................... 524/108

[56] References Cited

U.S. PATENT DOCUMENTS

| | | | |
|---|---|---|---|
| 3,244,650 | 4/1966 | Hecker et al. | 524/219 |
| 3,255,136 | 6/1966 | Hecker et al. | 524/219 |
| 3,285,855 | 11/1966 | Dexter et al. | 524/219 |
| 3,644,482 | 2/1972 | Dexter et al. | 524/291 |
| 3,745,145 | 7/1973 | Khattab et al. | 524/219 |

*Primary Examiner*—Maurice J. Welsh
*Attorney, Agent, or Firm*—Richard A. Negin; Jay P. Friedenson; Richard A. Anderson

[57] ABSTRACT

A melt processable fluoropolymer compositon stabilized against thermal degradation by incorporating therein a stabilizing system comprising (a) a hindered phenol pentaeythritol diphosphite, and (b) a salt of a carboxylic acid and a metal of Group II of the Periodic Table.

8 Claims, No Drawings

STABILIZED FLUOROPOLYMER COMPOSITION

DESCRIPTION

Background of the Invention

This invention relates to stabilized, meltprocessable fluoropolymer compositions, particularly ethylene/chlorotrifluoroethylene copolymer compositions, and to a process for stabilizing ethylene/chlorotrifluoroethylene copolymers against degradation during fabrication and use at elevated temperatures.

Equimolar ethylene/chlorotrifluoroethylene copolymers exhibit outstanding mechanical, electrical and chemical properties at high temperatures. For example, equimolar ethylene/chlorotrifluoroethylene copolymers resist attack of most organic solvents at ambient as well as elevated temperatures, being only slightly soluble at 100°–150° C. in, 2, 5-dichlorobenzotrifluoride/benzonitrile or O-dichlorobenzene mixtures of 10:90 to 50:50 volume ratio. They are insoluble in bases and acids, including fuming nitric acid. These copolymers also possess high tensile strength and having melting points above about 200° C. and as high as about 260° C., which melting points are higher than those of the homopolymers of either ethylene (as high as 130° C.) or chlorotrifluoroethylene (as high as 215° C.). Equimolar ethylene/chlorotrifluoroethylene copolymers also have outstanding electrical properties. For all of these advantageous properties, they are suitable for making useful articles, such as valves, gaskets, pipes, wire insulation, sheets or films for use in applications where their excellent mechanical, electrical and chemical properties can be used to advantage.

Equimolar ethylene/chlorotrifluoroethylene copolymers, due to their high melting points in excess of about 200° C., require melt fabrication temperatures of above about 250° C., usually within the range of between about 260° C. to 320° C. At these high temperatures, rapid degradation of the polymer occurs resulting in discoloration and loss of chemical, mechanical and electrical properties.

U.S. Pat. No. 3,745,145 discloses equimolar ethylene/chlorotrifluoroethylene copolymer compositions which are stabilized against thermal degradation. The stabilizing system comprises: a phosphite of an organic polyhydric phenol; a salt of a carboxylic acid and a metal of Group II of the Periodic Table; and a thiodipropionic acid ester of alkali metal salt. This stabilizing system is satisfactory for most melt fabircating techniques used to process ethylene/chlorotrifluoroethylene copolymer compositions.

U.S. Pat. Nos.: 3,644,482, 3,285,855, 3,255,136 and 3,244,650 are of interest.

SUMMARY OF THE INVENTION

The present invention is a stabilized melt processable fluoropolymer composition. There is intimately dispersed in the copolymer a stabilizer system comprising 0.2 to 3.0 percent by weight of a hindered phenol pentaeythritol diphosphite having the general formula:

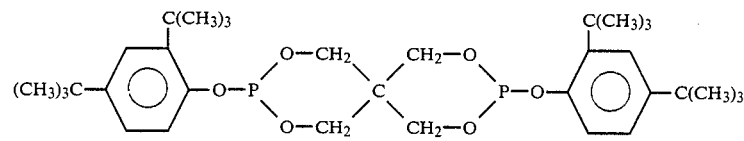

wherein the R substituents, which may be the same or different, are independently selected from the group consisting of hydrogen and alkyl, straight or branched chain, having from 1 to about 18 carbon atoms; and wherein m and n are integers from 0 to 2, and o and p are intergers from 1 to 5, with the proviso that the sums of m+o, and n+p may not exceed 5. There is preferably 0.01 to 3.0 percent by weight of the polymer of a salt of a monocarboxylic acid having from about 6 to about 24 carbon atoms and a metal of Group II of the Periodic Table. A preferred hindered phenol pentaeythritol is bis[2,4-di-t-butylphenyl]pentaerythritol diphosphite having the formula:

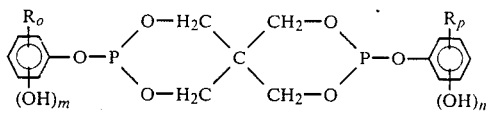

Fluoropolymers which can be stabilized according to the present invention include ethylene/chlorotrifluoroethylene copolymer, polyvinylidene fluoride, fluorinated ethylene propylene copolymer (FEP), chlorotrifluoroethylene ethylene/tetrafluoroethylene, and mixtures thereof. The fluoropolymers of the present invention can contain up to ten percent of other copolymerizable monomers.

A preferred embodiment of the present invention comprises an equimolar ethylene-chlorotrifluoroethylene copolymer, 0.2 to 0.8 percent by weight of bis[2,4-di-t-butylphenyl]pentaerythritol diphosphite, and 0.1 to 0.5 percent by weight of zinc stearate.

DESCRITPTION OF THE PREFERRED EMBODIMENTS

The present invention is a stabilized melt processable fluoropolymer composition. The stabilizer system is described in detail below. Concentrations of the various components of the stabilizer system are in weight percent based on the weight of the copolymer unless otherwise indicated.

Fluoropolymers which can be stabilized according to the present invention include ethylene/chlorotrifluoroethylene copolymer, polyvinylidene fluoride, fluorinated ethylene propylene copolymer (FEP), chlorotrifluoroethylene ethylene/tetrafluoroethylene, and mixtures thereof.

The fluoropolymers can contain nominal amounts, up to ten percent, of other copolymerizable comonomers, including propylene, isobutylene, vinyl fluoride, hexafluoropropylene, tetrafluoroethylene, vinylidene fluoride, perfluoro-vinyl ether, acrylic acid and alkyl ester, methacrylic acid and alkyl ester, perfluoro alkyl ethylene, hexafluoroisobutylene, etc.

The copolymers of ethylene and chlorotrifluoroethylene, which can be used in the composition of the present invention, are high molecular weight, normally solid, thermoplastic polymers containing from 40 to 60 mol percent of ethylene units in the molecule, and correspondingly 60 to 40 mol percent chlorotrifluoroethylene units. The melt index is preferably from about 1 to about 50, more preferably from 0.5 to 30, and most preferably from 1.0 to 25 grams/10 minutes. The melt index is measured in accordance with modified ASTM Test No. 1238, run at 275° C. under a piston load of 2160 grams. The copolymer has a melting point from about 200° C. to about 265° C. The processing temperatures are generally in the range from 240° C. to 320° C., and preferably 260° C. to 300° C.

The stabilizing compositions in accordance with the present invention are particularly advantageous for use in about equimolar ethylene/chlorotrifluoroethylene copolymers containing between about 45 and about 55 mol percent of ethylene units and having melting points about about 220° C.

These copolymers may be prepared by precesses known to those skilled in the art, as described, for example, in Hanford U.S. Pat. No. 2,392,378, which shows copolymerization of ethylene with chlorotrifluoroethylene in a stirred aqueous medium at superatromospheric pressure using benzoyl peroxide as catalyst; in NUCLEONICS, September, 1964, pp. 72-74, disclosing formation of a high melting (237° C.) 1:1 alternating copolymer of ethylene and chlorotrifluoroethylene prepared using a radiation at 0° C.; or British Patent No. 949,422, showing bulk copolymerization of ethylene with chlorotrifluoroethylene at temperatures beteen −80° C. to +50° C. using oxygen-activated alkyl boron catalyst; or Ragazzini et al. U.S. Pat. Nos. 3,371,076 and 3,501,446, respectively, relating to methods for making ethylene/chlorotrifluoroethylene copolymers using oxygen-activated boron-containing catalysts and to products obtained by that process. About equimolar ethylene/chlorotrifluoroethylene copolymers having a melting point above 200° C. can also be prepared by batchwise bulk copolymerization of the monomer at temperatures of about 0° C., say between about −20° to +20° C., at superatmospheric pressure in an agitator-equipped pressure vessel by charging the vessel with liquid chlorotrifluoroethylene monomer and bubbling gaseous ethylene into this monomer, using organic peroxide-type initiators, such as trichloroacetyl peroxide and, if desired, adding small amouts of chain transfer agents, such as chloroform or heptane. The desired copolymer product is obtained as a dispersion in the monomer.

The stabilizer useful in the composition of the present invention is a hindered phenol pentaeythritol diphosphite having the general formula:

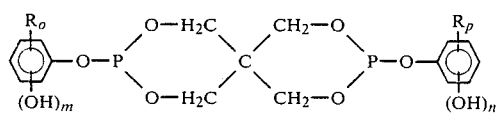

wherein the R substituents, which may be the same or different, are independently selected from the group consisting of hydrogen and alkyl, straight or branched chain, having from 1 to about 18 carbon atoms; and wherein m and n are integers from 0 to 2, and o and p are integers from 1 to 5, with the proviso that the sums of m+o, and n+p may not exceed 5. There is from 0.2 to 3.0 and preferably 0.2 to 0.8 percent of the stabilizer based on the weight of the polymer.

The stabilizer which has been found particularly useful is bis[2,4,-di-t-butylphenyl]pentaerythritol diphosphite having the formula

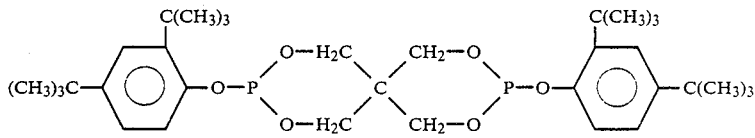

This material is sold by Borg-Warner Chemicals, Inc. as Ultranox ™ 624 and described in the bulletin Ultranox ™ Antioxidant, Technical Literature, CA-243A, 8305 2M hereby incorporated by reference.

Preferably, the stabilizer system of the present invention contains a salt of a mono-carboxylic acid having from about 6 to about 24 carbon atoms and a metal of Group II of the Periodic Table. The metal can, for example, be any one of zinc, calcium, cadmium, barium, magnesium, and strontium. The acid can be any organic monocarboxylic acid havng from about 6 to about 24 carbon atoms which does not contain nitro-gen. Suitable acids are also described in U.S. Pat. No. 3,244,650. As therein set forth, the aliphatic, aromatic, alicyclic and oxygen-containing heterocyclic organic acids are operable as a class. "Aliphatic acid" includes any open chain carboxylic acid, unsubstituted or substituted with unreactive groups such as halogens, sulfur or hydroxyl. "Alicyclic acid" includes any carboxylic acid having a non-aromatic ring optionally substituted by an unreactive substituent, such as halogens, hydroxyl groups or alkyl and alkyenyl radicals or other carboxylic ring structures. Suitable aromatic acids can be carboxylic or oxygen-containing heterocyclic and may be substituted by an unreactive ring substituent such as halogens, alkyl or alkenyl radicals and other saturated or aromtic rings condensed therewith. Suitable exemplary organic acids include those listed in U.S. Pat. No. 3,244,650, i.e. hexoic acid, 2-ethylhexoic acid, n-octoic acid, isooctoic acid, capric acid, undecylic acid, lauric acid, myristic acid, palmitic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicyclic acid, napthoic acid, 1-naphthalene acetic acid, orthobenzolyl benzoic acid, naphthenic acids derived from petroleum, abietic acid, dihydroabietic acid, hexanhydrobenzoic acid, and methyl furoic acid. There is from 0.01 to 10 percent, perferably 0.01 to 3.0 percent and more preferably 0.1 to 0.5 percent based on the weight of the polymer of the organic metal salt.

Organic zinc salts are preferred for use in the stabilizer compositions of the present invention, zinc-2-ethyl hexylate and zinc stearate being a specific examples of a preferred organic zinc salt. Calcium salts have also been found to be satisfactory.

The stabilizer system can be dry blended or solvent blended into the fluoropolymer. When the materials are solvent blended, the amount of stabilizer necessary to stabilize one pound of polymer can be dissolved in about 200 cc of trichlorofluromethane. This is then mixed with polymer powder on a ball mill. It is to be recognized that this invention is not limited by the method of blending, and that other methods to blend stabilizers into polymers can be used. The mixture can then be melt blended by means known in the art such as extruder blending.

The examples set forth below illustrate the nature of the invention and the manner of carrying it out. However, the invention should not be considered as being limited to the details thereof.

EXAMPLES 1–4

In the Example and Comparatives the polymer to be stabilized was an ethylene/chlorotrifluoroethylene (ECTFE) copolymer power manufactured by Allied Corporation as Halar ®5041 ECTFE copolymer, having a density of 1.68 gm/ml, a melt index of 15 g/10 minutes measured according to ASTM D-1238 run at 275° C., under a piston load of 2160 grams. The copolymer had about 40 to 51 mol percent ethylene and a corresponding amount of chlorotrifluoroethylene monomer.

The compositions evaluated included the following stabilizers:

1. Bis[2,4,-di-t-butylphenyl]pentaerthitol diphosphite having the formula

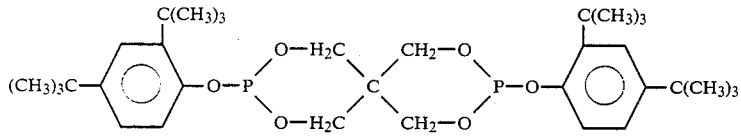

sold as Ultranox ™ 624 by Borg-Warner, (U-624);

2. A blend of 3 parts phosphite of 4,4,-n-butylidene-bis-(6-tert-butyl-m-cresol) and 1 part by weight of zinc -2-ethylhexylate sold as Mark ™ 158 by the Argus Chemical Co., and disterylthiodipropionate (DSTDP);

3. Tetrakis (2,4-di-tert-butyphenyl) 4,4′-biphenylylene-diphosphonite (PEPO) having the formula:

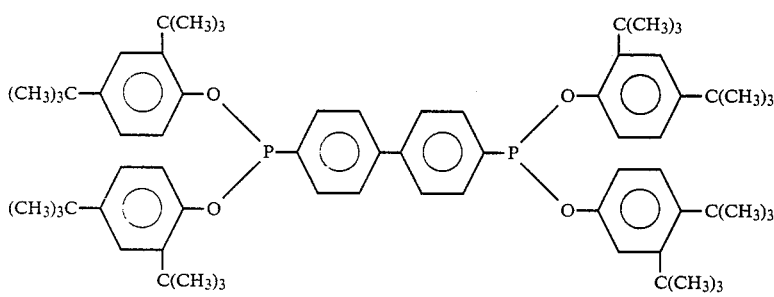

4. Weston ™ 619 (W-619) having the formula:

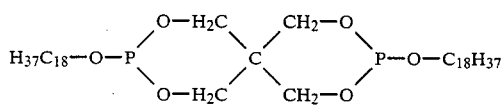

and;

5. Tetrakis [methylene 3-(3′,5′-di-tert-butyl-4′-hydroxy-phenyl)propionate] sold by Ciba-Geigy as Irganox ™ 1010 (I-1010).

In the Example and Comparatives the stabilizer was dry blended. The stabilizer and polymer were both in powder form and were mixed in a high intensity Henschel FM10 mixer at 2500 rpm for 4 minutes. The dry blends were then extruded through a Haake 1 inch single screw extruder having a L/D ratio of 3/1. The extrusion conclusions were Zone 1—225° C.; Zone 2—235° C.; Zone 3—245° C.; Die—225° C., at 64 rpm.

Table I summarizes the Example and Comparative compositions evaluated. The amounts of additives are based upon 100 parts of polymer.

TABLE I

| | ECTFE | Stabilizer | Metal Stearate |
|---|---|---|---|
| Ex. | | | |
| 1 | 100 | 0.3 U-624 | 0.15 Zn St |
| 2 | 100 | 0.3 U-624 | 0.15 Ca St |
| 3 | 100 | 0.3 U-624 | 0.075 Zn St |
| 4 | 100 | 0.3 U-624 | — |
| Comp. | | | |
| 1 | 100 | — | — |
| 2 | 100 | 0.3 U-624 | 0.15 Al St |
| 3 | 100 | 0.3 U-624 | 0.15 Na St |
| 4 | 100 | 0.3 PEPO | 0.15 Zn St |
| 5 | 100 | 0.3 W619 | 0.15 Zn St |
| 6 | 100 | 0.3 I-1010 | 0.15 Zn St |
| 7 | 100 | 0.3 Mark 158 | 0.15 DSTDP |
| 8 | 100 | 0.15 U-624 | 0.075 Zn St |

The above compositions were evaluated for the ability to prevent corrosion of silver plated wire on to which the compositions were coated and the ability to maintain color upon heat aging.

Samples to measure corrosion resistance were prepared by sandwiching ten 6 inch lengths of 24 Awg. (24 mil) soft copper wire with a 1.25 percent based on the weight of the wire, of a silver coating at equal distances from each other between the plaques of polymer and compression molding the sandwich at 225° C. The plaques were prepared by compression molding at 253° C. The wire plaque sandwiches were placed in a hot air oven at 200° C. for 48 hours. The wires were stripped from the plaque after aging and microscopically examined for color and surface appearance.

A Poor sample had the silver removed with a pitted brown surface remaining. A Fair sample had the silver partially removed with a brown surface remaining. A Good surface had the silver intact on the wire and only very slight dis-coloration, if any.

Pellets of samples to measure melt index stability were fed to the cavity of a Tunius Olsen melt index machine which was at 275° C. and extruded out every 15 minutes (15') and inspected.

The stability was shown by samples maintaining their color. The stability is indicated by NCC no color change, VSCC-very slight color change, VLB very light brown, and LB light brown.

The results of these evaluations are summarized on Table 2 below:

TABLE 2

|  | Corrosion Resistance | Stability @ 275° C. for | | | |
|---|---|---|---|---|---|
|  |  | 15' | 30' | 45' | 60' |
| Ex. |  |  |  |  |  |
| 1 | Good | NCC | NCC | VSCC | VLB |
| 2 | Good | NCC | VSCC | VLB | LB |
| 3 | Good | NCC | VSCC | VLB | LB |
| 4 | Good | NCC | VSCC | VLB | LB |
| Comp. |  |  |  |  |  |
| 1 | — |  |  |  |  |
| 2 | Fair | NCC | VSCC | VLB | LB |
| 3 | Fair | NCC | VSCC | VLB | LB |
| 4 | Fair | NCC | NCC | VLB | LB |
| 5 | Fair | NCC | VSCC | VLB | LB |
| 6 | Poor | NCC | VSCC | VLB | LB |
| 7 | Poor | NCC | NCC | NCC | VSCC |
| 8 | Fair | NCC | VSCC | VLB | LB |

The static stability of samples was measured by molding one inch by one inch by 1/16 inch plaques which were prepared by compresion molding at 225° C. The plaques exposed in a forced air oven on aluminum plates at a temperature of 275° C.

Samples were removed from the oven every 10 minutes for visual inspection. The results are summarized on Table 3. NCC-no color change, SCC-slight color change, LB-light brown, B-brown.

TABLE 3

| Time (min) | Ex. 1 | Comp. 1 | Comp. 7 |
|---|---|---|---|
| 0 | Base | Base | Base |
| 10 | NCC | LB | SCC |
| 20 | NCC | LB | SCC |
| 40 | NCC | B | LB |
| 60 | SCC | B | B |
| 80 | LB | B | B |
| 120 | B | B | B |

While exemplary embodiments of the invetion have been described, the true scope of the invention is to be determined from the following claims:

What is claimed is:

1. A stabilized fluoropolymer composition having improved thermal stability which comprises a melt processable fluoropolymer, and
   (a) 0.2 percent to 3 percent by weight of the polymer of hindered phenol pentaeythritol diphosphite having the general formula:

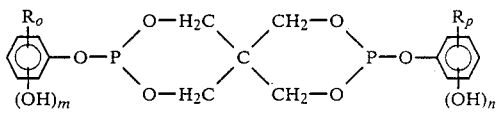

wherein the R substituents, which may be the same or different, are independently selected from the group consisting of hydrogen and alkyl, straight or branched chain, having from 1 to about 18 carbon atoms; and wherein m and n are integers from 1 to 2, and o and p are integers from 1 to 5, with the proviso that the sums of m+o, and n+p may not exceed 5, and
   (b) 0.01 percent of 3.0 percent by weight of the polymer of a salt of a monocarboxylic acid having from 6 to 24 carbon atoms and a metal of Group II of the Periodic Table.

2. The composition of claim 1 wherein the melt processable fluoropolymer is selected from the group consisting of an ethylene/chlorotrifluoroethylene copolymer containing about 40 to about 60 mol percent of ethylene units and about 40 to about 60 mol percent of chlorotrifluoroethylene units, polyvinylidene fluoride, fluorinated ethylene propylene polymer, chlorotrifluoroethylene, and mixtures thereof.

3. The composition as recited in claim 1 wherein the hindered phenol pentaerythritol diphosphite is bis[2,4,-di-t-butylphenyl]pentaerythritol diphosphite.

4. The composition of claim 3 wherein the fluoropolymer is an about equimolar ethylene/chlorotrifluoroethylene copolymer.

5. The composition of claim 3 wherein the salt of a monocarboxylic acid is a zinc salt.

6. The composition of claim 3 wherein there is from 0.2 to 3 percent by weight of bis[2,4,-di-t-butylphenyl]penaeythritol diphosphite.

7. A stabilized fluoropolymer composition having improved thermal stability which comprises a melt processable fluoropolymer, and 0.2 percent to 3 percent by weight of the polymer of hindered phenol pentaeythritol diphosphite having the general formula:

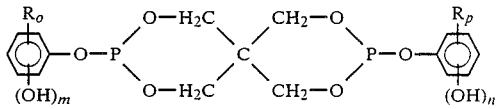

wherein the R substituents, which may be the same or different, are independently selected from the group consisting of hydrogen and alkyl, straight or branched chain, having from 1 to about 18 carbon atoms; and wherein m and n are integers from 1 to 2, and o and p are integers from 1 to 5, with the proviso that the sums of m+o, and n+p may not exceed 5.

8. The composition of claim 3 wherein there is from 0.2 to 3 percent by weight of bis[2,4,-di-t-butylphenyl]penaeythritol diphosphite.

* * * * *